United States Patent
Eastham et al.

(10) Patent No.: US 9,736,212 B2
(45) Date of Patent: Aug. 15, 2017

(54) OPTIMIZED BROWSER RENDERING PROCESS

(71) Applicant: GOOGLE INC., Mountain View, CA (US)

(72) Inventors: Michael Eastham, San Francisco, CA (US); Hui Xu, Sunnyvale, CA (US); Biping Meng, Beijing (CN); Xiaobo Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 14/531,080

(22) Filed: Nov. 3, 2014

(65) Prior Publication Data
US 2015/0381699 A1 Dec. 31, 2015

Related U.S. Application Data

(63) Continuation of application No. PCT/CN2014/080801, filed on Jun. 26, 2014.

(51) Int. Cl.
*G06F 15/16* (2006.01)
*G06F 15/173* (2006.01)
(Continued)

(52) U.S. Cl.
CPC ........ *H04L 67/02* (2013.01); *G06F 17/30887* (2013.01); *H04L 41/0293* (2013.01)

(58) Field of Classification Search
USPC ........ 709/203, 201, 209, 210; 707/706, 769, 707/748, 102, 100, 759
See application file for complete search history.

(56) References Cited

U.S. PATENT DOCUMENTS 5,845,115 A 12/1998 Bennett
6,271,840 B1 8/2001 Finseth et al.
(Continued)

FOREIGN PATENT DOCUMENTS

CN 101075236 A 11/2007
CN 101201827 A 6/2008
(Continued)

OTHER PUBLICATIONS

International Search Report and Written Opinion from corresponding application PCT/CN2014/080801, dated Mar. 30, 2015, 12 pages.
(Continued)

*Primary Examiner* — Jude Jean Gilles
(74) *Attorney, Agent, or Firm* — Brake Hughes Bellermann LLP

(57) ABSTRACT

Implementations optimize a browser render process by identifying content neutral embedded items and rendering a web page without fetching the content neutral items. An example method includes identifying a URL pattern common to a plurality of URLs stored in fetch records and selecting a sample of URLs from the plurality. The method also includes, for each URL in the sample, determining whether the URL is optional by generating a first rendering result using content for the URL and a second rendering result without using the content for the URL and calculating a similarity score for the URL by comparing the first rendering result and the second rendering result, the URL being optional when the similarity score is greater than a similarity threshold. The method may also include storing the URL pattern in a data store of optional resource patterns when a majority of the URLs in the sample are optional.

20 Claims, 7 Drawing Sheets

(51) Int. Cl.
*H04L 29/08* (2006.01)
*H04L 12/24* (2006.01)
*G06F 17/30* (2006.01)

(56) References Cited

U.S. PATENT DOCUMENTS

| | | | |
|---|---|---|---|
| 6,321,265 B1 | 11/2001 | Najork et al. | |
| 6,393,526 B1 | 5/2002 | Crow et al. | |
| 6,631,369 B1 | 10/2003 | Meyerzon et al. | |
| 6,643,641 B1* | 11/2003 | Snyder | G06F 17/30864 707/709 |
| 6,665,838 B1 | 12/2003 | Brown et al. | |
| 6,704,728 B1* | 3/2004 | Chang | G06F 17/30321 |
| 6,714,905 B1* | 3/2004 | Chang | G06F 17/2705 704/9 |
| 6,865,192 B1 | 3/2005 | Barrow | |
| 7,054,917 B1* | 5/2006 | Kirsch | H04L 67/2847 707/999.003 |
| 7,275,114 B2 | 9/2007 | Allen et al. | |
| 7,536,389 B1 | 5/2009 | Prabhakar et al. | |
| 7,886,218 B2 | 2/2011 | Watson | |
| 8,131,753 B2 | 3/2012 | Rybak et al. | |
| 8,135,705 B2 | 3/2012 | Beynon et al. | |
| 8,316,124 B1 | 11/2012 | Baumback et al. | |
| 8,346,755 B1 | 1/2013 | Kapoor et al. | |
| 8,353,028 B2 | 1/2013 | Lalonde et al. | |
| 8,539,359 B2* | 9/2013 | Rapaport | G06Q 10/10 709/217 |
| 8,543,580 B2* | 9/2013 | Chen | G06F 17/30864 707/748 |
| 8,578,261 B1 | 11/2013 | Gupta et al. | |
| 8,601,565 B1 | 12/2013 | Sakata et al. | |
| 8,640,017 B1* | 1/2014 | Chang | G06F 17/30731 715/200 |
| 8,650,493 B2 | 2/2014 | Miller | |
| 8,655,865 B1 | 2/2014 | Sankaran et al. | |
| 8,676,978 B2 | 3/2014 | Jiang et al. | |
| 8,689,117 B1 | 4/2014 | Vasilik et al. | |
| 8,707,162 B1 | 4/2014 | Jain | |
| 8,738,686 B2 | 5/2014 | Douthart | |
| 8,892,543 B1 | 11/2014 | Kapoor et al. | |
| 8,924,850 B1 | 12/2014 | Ramani et al. | |
| 9,256,795 B1* | 2/2016 | Gray | G06K 9/2054 |
| 2002/0065842 A1 | 5/2002 | Takagi et al. | |
| 2002/0078143 A1 | 6/2002 | De Boor et al. | |
| 2003/0041280 A1 | 2/2003 | Malcolm et al. | |
| 2003/0172121 A1 | 9/2003 | Evans et al. | |
| 2003/0191837 A1* | 10/2003 | Chen | H04L 41/142 709/224 |
| 2003/0229677 A1 | 12/2003 | Allan | |
| 2004/0123140 A1* | 6/2004 | Toomey | H04L 63/08 726/4 |
| 2005/0108339 A1 | 5/2005 | Gleeson et al. | |
| 2006/0069697 A1* | 3/2006 | Shraim | H04L 12/585 |
| 2006/0106844 A1 | 5/2006 | Naick et al. | |
| 2006/0129463 A1 | 6/2006 | Zicherman | |
| 2007/0005652 A1 | 1/2007 | Choi et al. | |
| 2007/0104208 A1 | 5/2007 | Svensson | |
| 2008/0010642 A1 | 1/2008 | MacLellan et al. | |
| 2008/0044016 A1 | 2/2008 | Henzinger | |
| 2008/0270659 A1 | 10/2008 | Grewal et al. | |
| 2009/0070869 A1 | 3/2009 | Fan et al. | |
| 2009/0077198 A1 | 3/2009 | Larsson et al. | |
| 2009/0164502 A1* | 6/2009 | Dasgupta | G06F 17/30887 |
| 2009/0300768 A1* | 12/2009 | Krishnamurthy | G06F 21/552 726/26 |
| 2010/0057802 A1 | 3/2010 | McKeeth | |
| 2010/0088612 A1 | 4/2010 | Jia et al. | |
| 2010/0131488 A1 | 5/2010 | Dasdan et al. | |
| 2010/0138485 A1 | 6/2010 | Chow et al. | |
| 2010/0153544 A1 | 6/2010 | Krassner et al. | |
| 2010/0161642 A1* | 6/2010 | Chen | G06F 17/30864 707/759 |
| 2010/0169301 A1* | 7/2010 | Rubanovich | G06F 17/30864 707/709 |
| 2010/0241621 A1* | 9/2010 | Randall | G06F 17/30864 707/709 |
| 2010/0262780 A1 | 10/2010 | Mahan et al. | |
| 2011/0055314 A1 | 3/2011 | Rosenstein et al. | |
| 2011/0083037 A1 | 4/2011 | Bocharov et al. | |
| 2011/0099133 A1 | 4/2011 | Chang et al. | |
| 2011/0119602 A1 | 5/2011 | Isozu | |
| 2011/0167063 A1* | 7/2011 | Tengli | G06F 17/30834 707/737 |
| 2011/0185287 A1* | 7/2011 | Dharmarajan | G06F 17/30902 715/752 |
| 2011/0191309 A1 | 8/2011 | Anderson et al. | |
| 2012/0036264 A1 | 2/2012 | Jiang et al. | |
| 2012/0158737 A1 | 6/2012 | Levy et al. | |
| 2012/0194519 A1 | 8/2012 | Bissell et al. | |
| 2012/0259833 A1 | 10/2012 | Paduroiu | |
| 2012/0317089 A1 | 12/2012 | Randall | |
| 2012/0323881 A1* | 12/2012 | Liu | G06F 17/30864 707/709 |
| 2013/0007586 A1 | 1/2013 | Thomas | |
| 2013/0117252 A1 | 5/2013 | Samaddar et al. | |
| 2014/0019953 A1* | 1/2014 | Kolesnikov | G06F 8/61 717/170 |
| 2014/0053056 A1 | 2/2014 | Weber et al. | |
| 2014/0189534 A1* | 7/2014 | Liu | G06F 17/30899 715/753 |
| 2014/0214788 A1* | 7/2014 | Koutrika | G06F 17/30887 707/708 |
| 2015/0172228 A1* | 6/2015 | Zalepa | H04L 12/1813 709/206 |
| 2015/0371142 A1* | 12/2015 | Jain | G06F 17/30902 706/52 |
| 2015/0379014 A1 | 12/2015 | Xu et al. | |
| 2015/0379155 A1 | 12/2015 | Meng et al. | |

FOREIGN PATENT DOCUMENTS

| | | |
|---|---|---|
| CN | 101587495 A | 11/2009 |
| CN | 101763357 A | 6/2010 |
| CN | 103034503 A | 4/2013 |
| EP | 2728481 A1 | 5/2014 |
| JP | 2002055872 A | 2/2002 |
| JP | 200 2510819 A | 4/2002 |
| JP | 2012522322 A | 9/2012 |
| WO | 2015/196405 A1 | 12/2015 |

OTHER PUBLICATIONS

English Translation of Japanese Office Action from JP2016-574382, dated May 15, 2017, 2 pages.

* cited by examiner

OPTIMIZED BROWSER RENDERING PROCESS

CROSS-REFERENCE TO RELATED APPLICATION

This application is a Continuation under 35 U.S.C. §120 of International Patent Application No. PCT/CN2014/080801, filed on Jun. 26, 2014, entitled "OPTIMIZED BROWSER RENDERING PROCESS". The disclosure of this earlier-filed application is incorporated herewith in its entirety.

BACKGROUND

Many web pages are dynamically created, meaning that the final page viewed by the user of a web browser is generated at least partially by the browser rendering process. Embedded objects, such as script, images, and style sheets, are often embedded in the web page and may affect the content and appearance of the rendered web page or may be included for other purposes unrelated to generating dynamic content. For example, the Google Analytics JavaScript code may be an embedded object that helps track traffic to a web site, but does not affect content. Embedded objects themselves may include additional embedded objects. Similarly, some embedded objects may be hidden and not viewable to the user. A web page may have hundreds of embedded objects and much of the time it takes a browser's rendering engine to render the web page for the user is spent waiting for the browser to fetch these embedded resources.

SUMMARY

Implementations identify optional embedded resources and allow the rendering engine to skip over such resources, which improves rendering time. Optional resources represent embedded objects that can be skipped without affecting the content of the rendered web page in a meaningful or significant way. The browser may skip such optional embedded resources during the rendering process, resulting in faster load times.

In one aspect, a system includes at least one processor and memory storing instructions that, when executed by the at least one processor, cause the system to perform operations. The operations may include identifying a URL pattern common to a plurality of URLs stored in fetch records and selecting a sample of URLs from the plurality of URLs. The operations also include determining, for each URL in the sample, whether the URL is optional by rendering a first rendering result for an embedder of the URL using content for the URL, rendering a second rendering result for the embedder without using the content for the URL, and calculating a similarity score for the URL by comparing the first rendering result to the second rendering result. The method also includes determining that the URL is optional when the similarity score is greater than a similarity threshold and, when a predetermined quantity of the URLs in the sample are optional, storing the URL pattern in a data store of optional resource patterns.

One or more of the implementations of the subject matter described herein can include one or more of the following features. For example, the operations may also include receiving a request for content of a requested embedded resource, determining whether the requested embedded resource matches the pattern in the data store, and returning an indication that the requested embedded resource is optional when the requested embedded resource matches the pattern. In some implementations, the indication may be a URL not found error. As another example, identifying the URL pattern common to the plurality of URLs stored in the fetch records can include generating a group URL for respective URLs stored in the fetch records by removing at least a portion of a query string from the URL and clustering the URLs by group URL. As another example, identifying the URL pattern common to the plurality of URLs stored in the fetch records can include generating a group URL for respective URLs stored in the fetch records by removing at least a portion of a query string from the URL, clustering the URLs by group URL, and selecting the group URL of a cluster with a highest number of members as the URL pattern. As another example, calculating the similarity score can include determining a longest common sequence for a DOM tree of the first rendering result and a DOM tree of the second rendering result and using the longest common sequence to determine the similarity score.

In another aspect, a computer implemented method includes identifying a URL pattern common to a plurality of URLs stored in fetch records and selecting, using the at least one processor, a sample of URLs from the plurality of URLs. The method may also include determining, for each URL in the sample, whether the URL is optional by generating a first rendering result for an embedder of the URL using content for the URL, generating a second rendering result for the embedder without using the content for the URL, and calculating a similarity score for the URL by comparing the first rendering result and the second rendering result, the URL being optional when the similarity score is greater than a similarity threshold. The method may also include storing the URL pattern in a data store of optional resource patterns when a majority of the URLs in the sample are optional.

One or more of the implementations of the subject matter described herein can include one or more of the following features. For example, the method may also include determining that a quantity represented by the plurality of URLs exceeds a size threshold prior to determining whether URLs in the sample are optional. As another example, the method may include storing the URL pattern in the data store of optional resource patterns when all the URLs in the sample are optional. As another example, identifying the URL pattern common to the plurality of URLs in the fetch records may include for respective URLs in the fetch records, generating a group URL for the URL in the fetch record by removing at least a portion of a query string from the URL, clustering by group URL, and selecting the group URL of a cluster when a quantity of members in the cluster meets a threshold.

In another aspect, a method includes receiving a request to render a web page, identifying at least one embedded resource in the web page that requires a fetch, determining that the embedded resource is an optional resource, and rendering, the web page as if the embedded resource is unavailable without fetching content for the embedded resource.

One or more of the implementations of the subject matter described herein can include one or more of the following features. For example, determining that the embedded resource is an optional resource can include determining that a URL for the embedded resource matches a pattern in a data store of optional resources. As another example, the method may also include receiving a data store of patterns for optional resources from a service, wherein determining that the embedded resource is an optional resource includes determining that a URL for the embedded resource matches a pattern in the data store. As another example, determining that the embedded resource is an optional resource can include rewriting a URL for the embedded resource by removing a query string portion from the URL, and matching the rewritten URL to a pattern in a data store of optional resources, wherein the embedded resource is optional when the rewritten URL matches the pattern. As another example, determining that the embedded resource is an optional resource can include rewriting a URL for the embedded resource by removing at least a portion of a query string from the URL and matching the rewritten URL to a pattern in a data store of optional resources, wherein the embedded resource is optional when the rewritten URL matches the pattern.

In another aspect, a non-transitory computer-readable medium may include instructions executable by at least one processor formed in a substrate that cause a computer system to perform one or more of the methods described above.

One or more of the implementations of the subject matter described herein can be implemented so as to realize one or more of the following advantages. As one example, skipping optional embedded resources allows the rendering engine to render the web page faster without losing content. Not only can the browser skip fetching the optional embedded resource, the browser also skips fetching objects embedded in the skipped optional embedded resource. Disclosed implementations thus save on network bandwidth and battery consumption. Because web pages may include hundreds of embedded objects, such optimizations can be substantial.

DETAILED DESCRIPTION

Disclosed implementations identify optional embedded objects, or embedded objects that do not significantly affect the content of the rendered web page, allowing the browser rendering engine to render such web pages without fetching the optional embedded objects. This improves rendering time and the load on a fetching system, which is important for computing devices with limited resources, such as smart phones and tablets. An embedded resource may be a candidate for optimized rendering when a rendering result of the embedder web page rendered with the optional embedded object is similar to a rendering result of the embedder web page rendered without the optional embedded object. Similarity may be determined by similarity of tokens in the page, similarity of outlinks, similarity of the page layout, etc. In some implementations, the system may use a longest common sequence measurement to determine whether the rendering results are similar. In some implementations, when major components of the snapshots have a similarity score that meets a similarity threshold, the snapshots may be considered similar. If the system determines that the embedded resource is optional, the system may store the embedded resource (e.g., its Uniform Resource Locator or URL) in a list of optional embedded resources. In some implementations, the system may aggregate optional embedded resource URLs to identify a pattern that can be used to identify other optional embedded resources.

When a browser begins rendering a web page it may ask a service if any of the embedded resources are optional. In some implementations, this may be done as part of a fetch request. The service may match the URL of the requested embedded resources to a data store of optional embedded objects, either by exact match or matching a pattern in the data store. If the service finds a match the service may tell the browser which embedded resources are optional and the browser may render the web page without fetching these embedded resources. Such optimized browser rendering makes the browser rendering process much more resource efficient. In some implementations, the optional embedded resource data store may distinguish between browser types, e.g., mobile browsers and desktop browsers.

Figure 1:
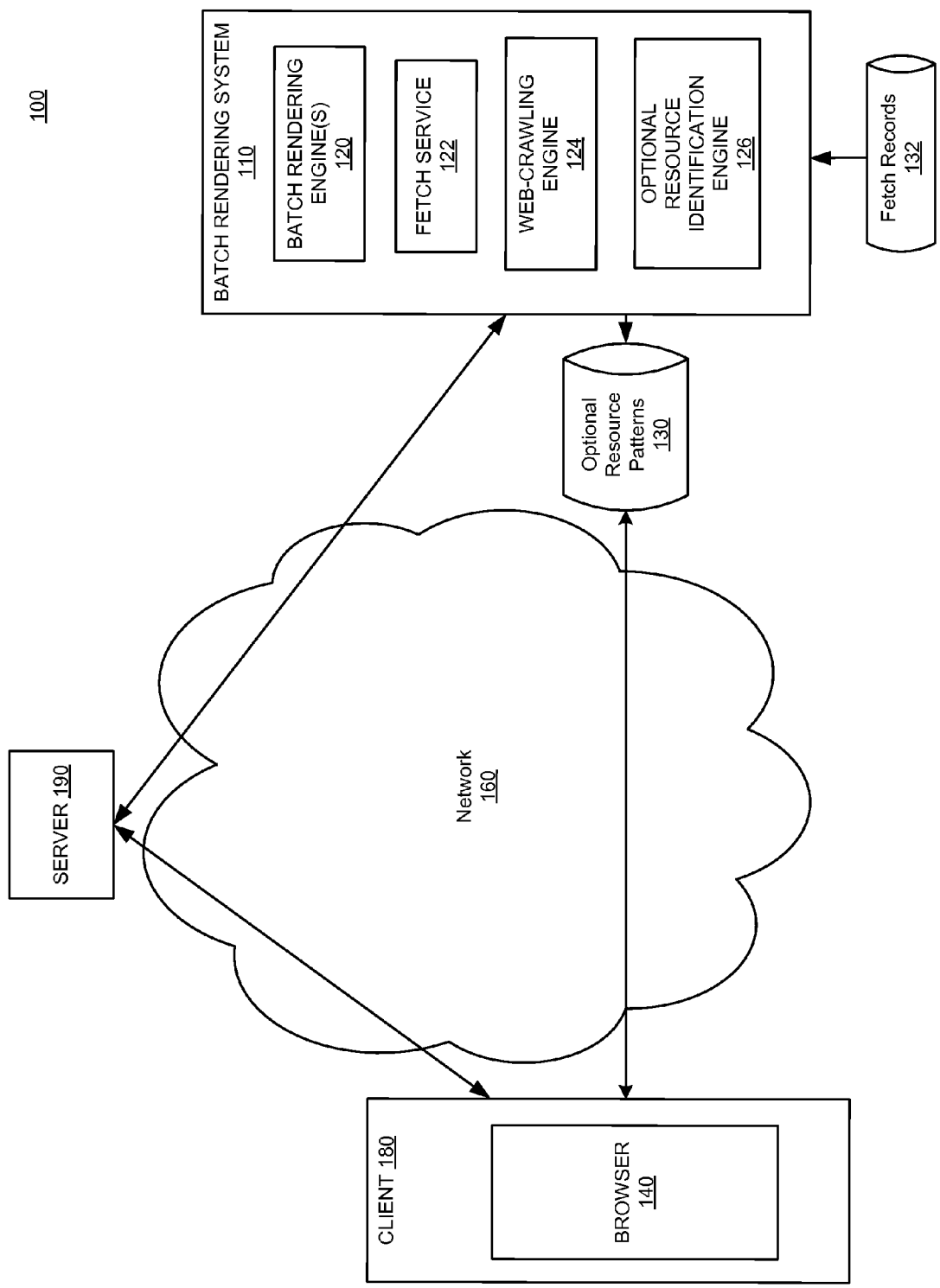
FIG. 1 illustrates an example system in accordance with the disclosed subject matter.
Figure 6:
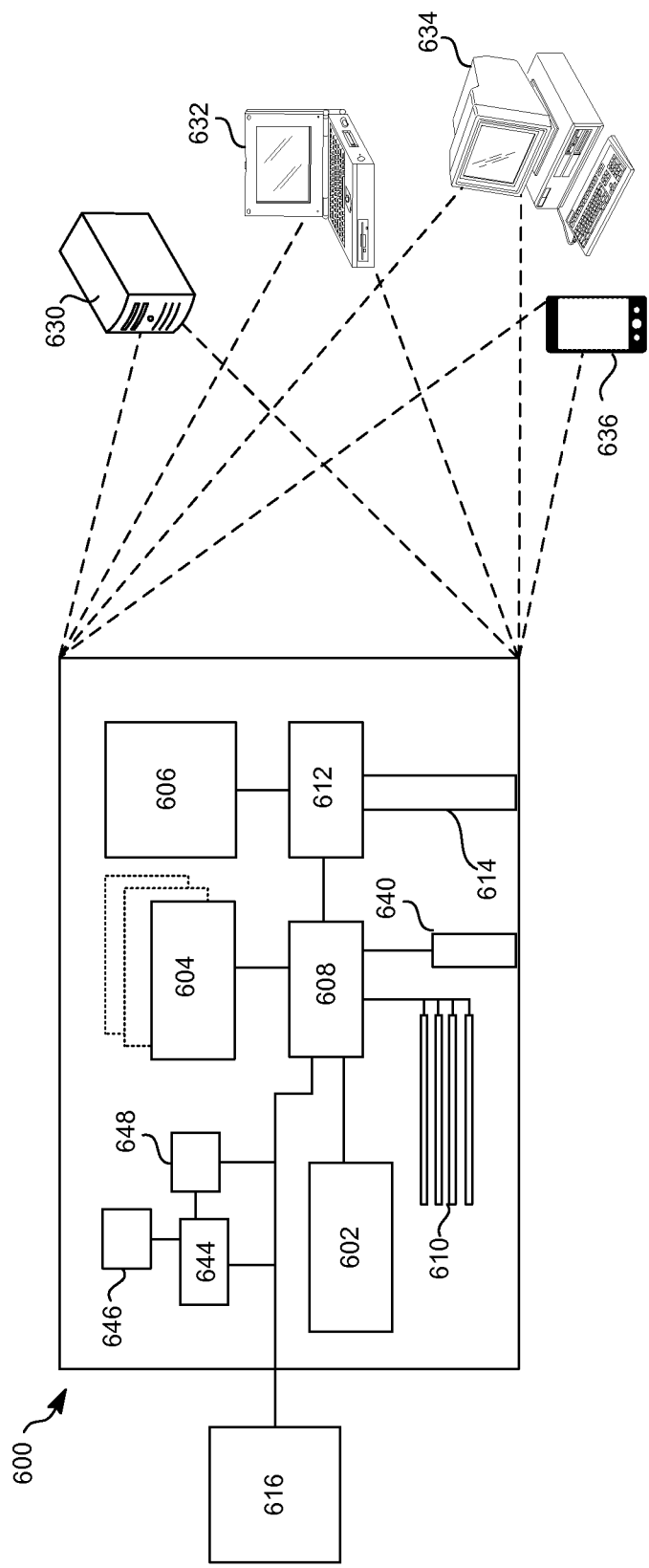
FIG. 6 shows an example of a computer device that can be used to implement the described techniques.
Figure 7:
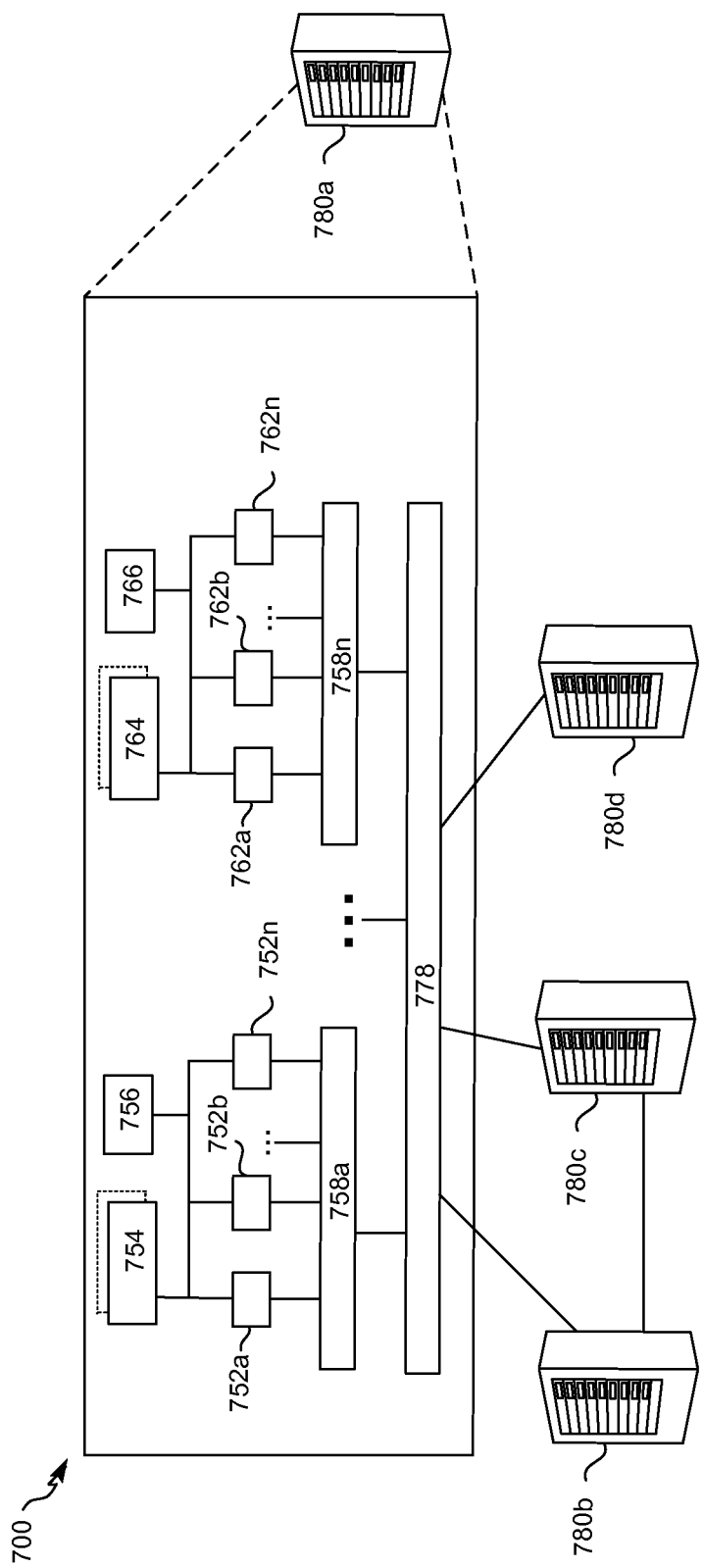
FIG. 7 shows an example of a distributed computer device that can be used to implement the described techniques.

FIG. 1 is a block diagram of a system in accordance with an example implementation. The system 100 may be used to identify optional embedded resources and optional resource patterns and use the patterns to optimize a browser rendering process. The system 100 may include computing devices that take the form of a number of different devices. For example, the system 100 may include computing devices that are examples of computer device 600, as depicted in FIG. 6, and computer device 700, as depicted in FIG. 7.

The system 100 may include a batch rendering system 110. The batch rendering system 110 may be a standard server, a group of such servers, a client-server system, or a rack server system. In addition, the batch rendering system 110 may be implemented in a personal computer. The batch rendering system 110 may include one or more processors configured to execute one or more machine executable instructions or pieces of software, firmware, or a combination thereof, stored in memory. For example, the batch rendering system 110 may include rendering engines 120, fetch service 122, web-crawling engine 124, and optional resource identification engine 126. The batch rendering system 110 may produce a rendered web page in batch mode, for example as part of an indexing process and, in the process, produce fetch records 132, which the batch rendering system 110 may use to generate optional resource patterns 130.

A downstream process may request that the batch rendering system 110 render a web page in batch mode. In some implementations, the batch rendering system 110 may include the downstream process, such as the optional resource identification engine 126 or an indexing engine (not shown). In some implementations the downstream process may be executed on a computing device that differs from batch rendering system 110. For example, the downstream process may be an indexing engine or an advertising platform that sends requests to the batch rendering system via a remote procedure call. The downstream process may request that one of the batch rendering engines 120 generate a rendering result of a particular web page. Each batch rendering engine 120 may be configured to emulate a renderer for personal web browser, but with optimizations for batch rendering. The batch rendering system 110 may include thousands of batch rendering engines 120 and use load-balancing to select one of the batch rendering engines 120 to respond to a particular request. The requested web page may include embedded objects, such as such as style sheets, JavaScript, images, etc. The batch rendering engines 120 may request the contents for the embedded objects using the fetch service 122.

The fetch service 122 may determine which embedded resources need to be fetched from the host server 190, which embedded resources can be returned from a cache, and which resources do not need to be returned. Host servers 190 may be any type of computing device accessible over the Internet that hosts one or more web pages or resources embedded in one or more web pages. If an embedded resource needs to be fetched, the fetch service 122 may request the content for the embedded object via web-crawling engine 124 using conventional techniques. A downstream process, such as an indexing engine, may also request content from servers 190 via web-crawling engine 124. As a result of the fetch requests via the web-crawling engine 124, the batch rendering system 110 may generate fetch records 132. Fetch records 132 may include information about which web pages and embedded objects were requested and retrieved from host servers 190. The fetch records 132 may also include additional information, such as the time of the request, the embedder web page, if any, etc.

The web-crawling engine 124, the batch rendering engines 120, and the fetch service 122 work together to efficiently render a large number of web pages, such as web pages that can be found on the World Wide Web. The rendering of a web page is a rendering result, which includes various data elements useful to, and otherwise unavailable to, the downstream requesting process. The optional resource identification engine 126 may use the batch rendering engines 120 to generate optional resource patterns 130. The optional resource identification engine 126 may run periodically (e.g., daily, twice a week, etc.), using the fetch records 132 as input. The optional resource identification engine 126 may analyze the fetch records 132 and generate patterns for URLs fetched in a prior period. For example, the optional resource identification engine 126 may strip the query string off of the URLs in the fetch records, generating a group URL for each respective URL. The query string may be any characters after a question mark (?) in the URL. In some implementations, only parts of the query string may be stripped off to generate a group URL for the URL. The optional resource identification engine 126 may then sort or cluster the group URLs and determine which group URLs had the largest number of fetch requests from the time period.

The optional resource identification engine 126 may select as potential patterns group URLs with the highest number of fetch requests. Such patterns represent embedded resources that have the best potential for optimizing the browsing process, as they are fetched most often. The optional resource identification engine may determine whether URLs that match the potential pattern, or a sample of URLs that match the potential pattern are optional. For example, the optional resource identification engine 126 may identify an embedded resource that matches the potential pattern from the fetch records 132 and request that the batch rendering engines 120 render a first rendering result of the embedder web page for the embedded resource. The embedder web page may be identified, for example, from the fetch record for the embedded resource. The optional resource identification engine 126 may then request that the batch rendering engines 120 render a second rendering result of the embedder web page without fetching the embedded resource.

To determine whether the rendered content of the embedder web page is affected by skipping the particular embedded resource, the optional resource identification engine 126 may compare the first rendering result and the second rendering result. In some implementations, if the content is significantly affected, the particular embedded resource may be added to a list of required resources. If the content is not significantly affected (e.g., the content is similar), the optional resource identification engine 126 may identify the embedded resource as an optional resource. In some implementations, the embedded resource (e.g., it's URL) may be stored in a data store, such as optional resource patterns 130. In some implementations, the embedded resource may be stored in a temporary list of optional resources used at a later time to determine patterns for optional resources. The optional resource identification engine 126 may perform this test (the comparison of rendering results) over every embedded resource that matches the potential pattern in the fetch records, or for a sample of the embedded resources that match the potential pattern. In some implementations, if any of the embedded resources that match the potential pattern are relevant, the potential pattern is not an optional resource pattern. In some implementations, if only a small percentage of the embedded resources that match the potential pattern (e.g., 1% or less) are required resources, the potential pattern is considered an optional resource pattern and the optional resource identification engine 126 may include the potential pattern as a pattern in the optional resource patterns 130. Of course, if all tested embedded resources that match the potential pattern are optional, the optional resource identification engine 126 may add the potential pattern to the optional resource patterns 130.

In some implementations, the optional resource identification engine 126 may also verify that patterns in the optional resource patterns 130 are still optional. For example, the optional resource identification engine 126 may select a sample of URLs matching the pattern, ask the rendering engine to render a rendering result with the embedded resource that matches the pattern and without the embedded resource, and compare the two rendering results. If a URL matching a pattern in the optional resource patterns 130 is no longer optional, the pattern may be removed.

In some implementations, the optional resource identification engine 126 may determine whether a pattern is optional for mobile browsers separately from full browsers. For example, some websites load different content for a mobile version of a web page and a full version, and an embedded resource may be optional for the mobile browser but required for the full browser. Thus, the optional resource identification engine 126 may render four rendering results for an embedded resource. The first two rendering results may be rendered by a rendering engine that emulates a full browser, while the last two rendering results may be rendered by a rendering engine that emulates a mobile browser on a mobile device, such as a smart phone or tablet. The optional resource patterns 130 may, thus, include data indicating whether the pattern is optional by browser type, e.g., for a mobile browser or for a full browser.

Although not shown in FIG. 1 for the sake of brevity, in some implementations, the batch rendering system 110 may be distributed over two or more separate computing devices. In addition, one or more of the batch rendering engines 120, the fetch service 122, the web-crawling engine 124, and the optional resource identification engine 126 may be distributed across one or more computing devices. In some implementations, one or more of the batch rendering engines 120, the fetch service 122, the web-crawling engine 124, and the optional resource identification engine 126 may share resources, such as memory or hardware processors with other components of the batch rendering system 110. Similarly, fetch records 132 and optional resource patterns 130 may also be stored in memory distributed across multiple computing devices. In some implementations, the various components of the batch rendering system 110 may share hardware components of a computing device, or may be logical partitions of the same computing device.

The batch rendering system 110 may be in communication with the client(s) 180 and servers 190 over network 160. Network 160 may be for example, the Internet or the network 160 can be a wired or wireless local area network (LAN), wide area network (WAN), a combination of these, etc., implemented using, for example, gateway devices, bridges, switches, and/or so forth. Via the network 160, the batch rendering system 110 may communicate with and transmit data to/from clients 180 and/or host servers 190. For example, the batch rendering system 110 may provide optional resource patterns 130 to a client 180, or may receive a request from client 180 asking whether a particular embedded resource is optional and may provide a response based on the optional resource patterns 130.

The client 180 may be a personal computing device, such as computing device 600 depicted in FIG. 6, with a personal web browser 140 installed. Examples of personal web browsers include CHROME, SAFARI, INTERNET EXPLORER, FIREFOX, etc., whether for a mobile device such as a smart phone or tablet, or a personal computer, such as a laptop or desktop. The browser 140 may be configured to use a service to determine whether to fetch a particular embedded resource when rendering a web page. In some implementations, the system may push a copy of the optional resource patterns 130 to the client 180 for use by the browser 140. In this sense, the service may be a local service. In some implementations, the browser 140 may be configured to ask a server-based service to determine if a particular embedded resource matches one of the patterns in the optional resource patterns 130. The browser 140 performs optimized rendering by using the service to skip optional embedded resources when rendering a web page. Thus, the browser 140 may be configured to selectively skip embedded resources to improve rendering time and conserve resources where the content is not affected.

Figure 2:
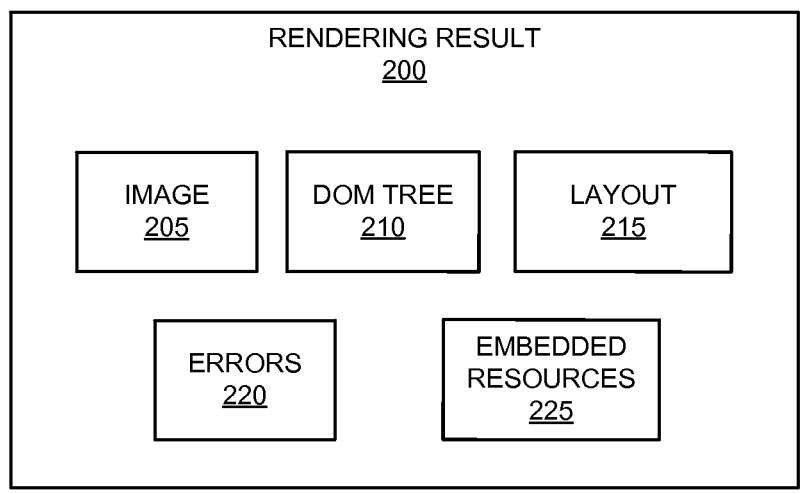
FIG. 2 is a block diagram of a rendering result for a rendered web page, according to an implementation.

FIG. 2 is a block diagram of a rendering result 200 rendered by a batch rendering engine 120, according to an implementation. The rendering result 200 may include a variety of components, not all of which are illustrated in FIG. 2. For example, the rendering result 200 can include an image 205 of the rendered page. The image 205 may be the image that would be displayed via a display device to a user via a web browser. The image 205 can be used, for example, to display a thumbnail of the rendered page to a user and to determine where on the display elements of the web page occur (e.g., based on their x and y coordinates). The rendering result 200 can also include a Document Object Model (DOM) tree 210. The DOM tree 210 represents the HTML structure of the web page. The rendering result 200 may also include layout 215. Layout 215 generally includes a box for the elements of the web page, the box specifying the x and y coordinates of the element in the image 205. Thus, the layout 215 provides an indication of where on the web page an element occurs, how much space it takes on the web page, etc. Thus, the layout 215 provides information on how much of the web page is ads, how prominent a paragraph is (e.g., above-the-fold or below-the-fold), whether the element is visible, etc. In other words, the layout 215 provides geometric information about the elements of the rendered web page. The rendering result 200 may also include errors 220. Errors 220 include errors encountered as a result of running script objects, e.g., JavaScript. The rendering result 200 may also include a list of embedded resources 225 fetched during the rendering, and can include other elements (not shown) generated as part of the rendering process. Thus, the rendering result 200 provides information not available solely via a fetch of content from the hosting server. Downstream requesting processes, such as an optional resource identification engine, can use the rendering result information for various purposes, such as to determine whether running script objects significantly changes the content of a rendered web page. For example, content in an advertising portion of a web page may not be considered important, so a URL may still be optional even with differences in an advertising portion. In some implementations, only differences in major components of the rendering result may be considered important. The major components may be the largest boxes in the layout 215 (e.g., the boxes with the largest height and width).

Figure 3:
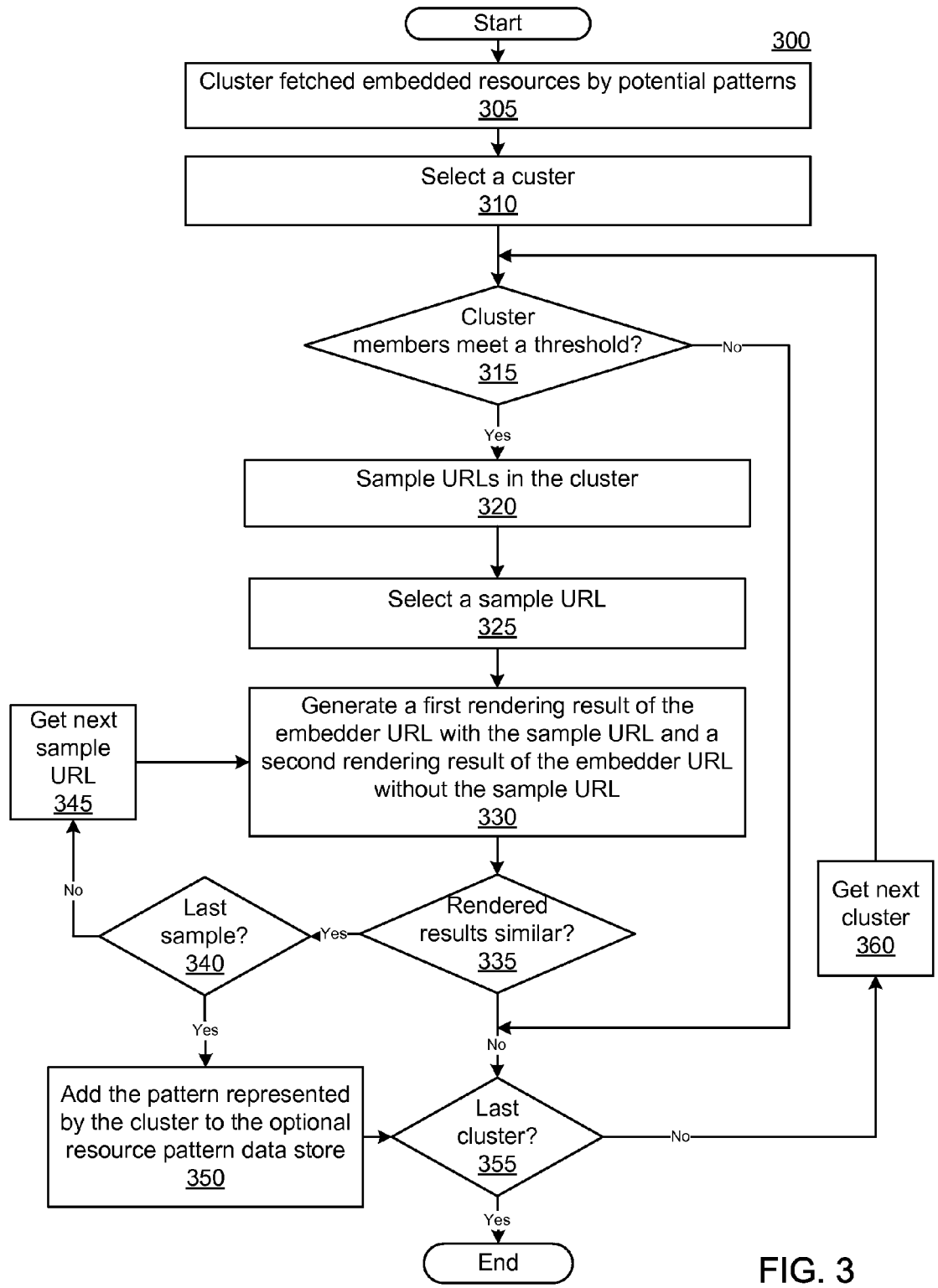
FIG. 3 is a flowchart illustrating an example process for identifying optional resource patterns, according to an implementation.

FIG. 3 is a flowchart illustrating an example process 300 for identifying optional resource patterns, according to an implementation. The process 300 may be performed by a system, such as system 110 of FIG. 1. The system may use process 300 to identify patterns for optional resources from fetch records. The system may determine patterns for optional resources based on a rendering result comparison of an embedder web page rendered with the resource and without the resource. The patterns may be stored in a data store and used as part of a service that allows a browser, whether a full browser, a mobile browser, or a batch rendering engine, to optimize rendering by skipping (e.g., not fetching) optional resources.

Process 300 may begin with the system clustering fetched embedded resources by potential patterns (305). The system may select all embedded resources fetched in some prior time period for example one day, two days, one week, since the last time process 300 was run, etc. The potential patterns may be generated by stripping off all or part of a query string from the URL found in the fetch records. The fetch records may have been generated by a web-crawling engine or a fetch service. In some implementations, the fetch records may be generated as part of an indexing process, for example an indexing process for documents available via the Internet. The embedded resource may be identified in the fetch record by an identifier, such as a URL. Thus, a web page or an embedded resource may also be referred to as a URL, and it is understood that reference to an embedded resource (or a web page) and a URL are generally synonymous as used herein. A potential pattern may be generated for a URL by stripping off all or part of a query string, the query string being any characters that follow a question mark (?) in the URL for the embedded resource. A potential pattern may also be generated for an embedded resource by stripping off or ignoring the subdomain name, ignoring components of the path (e.g., components between the first forward slash ("/") and the query string ("?"), or ignoring certain parameters in the query string. In some implementations, an embedded resource from the fetch records may be associated with more than one potential pattern generated from its URL. Potential URLs may be clustered by sorting or by other known clustering techniques.

The system may select a cluster, represented by one of the potential patterns (310) and determine whether the quantity of cluster members is greater than or equal to a threshold (315). The quantity of cluster members represent the quantity of times embedded resources that match the potential pattern were fetched during the prior time period. Thus, one particular embedded resource may be represented multiple times in the quantity if it was fetched more than once. If the quantity for the cluster is below the threshold (315, No), the system may go on to the next cluster (355). If the potential pattern does have a sufficient quantity of members (315, Yes), the system may select a sample of the embedded resources that match the potential pattern (320). In other words, the system may sample unique members of the cluster. Of course in some implementations, the system may select all unique embedded resources in the cluster as the sample (e.g., a sample size of 100%). The system may then select one of the embedded resources in the sample (325) and generate a first rendering result of a web page embedding the resource (e.g., the embedder web page) with the selected embedded resource (330). The embedder web page may be determined from the fetch records. The system may also generate a second rendering result of the embedder web page without fetching the selected embedded resource (330). The system may generate the two rendering results using, for example, a batch rendering engine. The system may then compare the first rendering result and the second rendering result to determine if the rendering results are similar (335).

Figure 4:
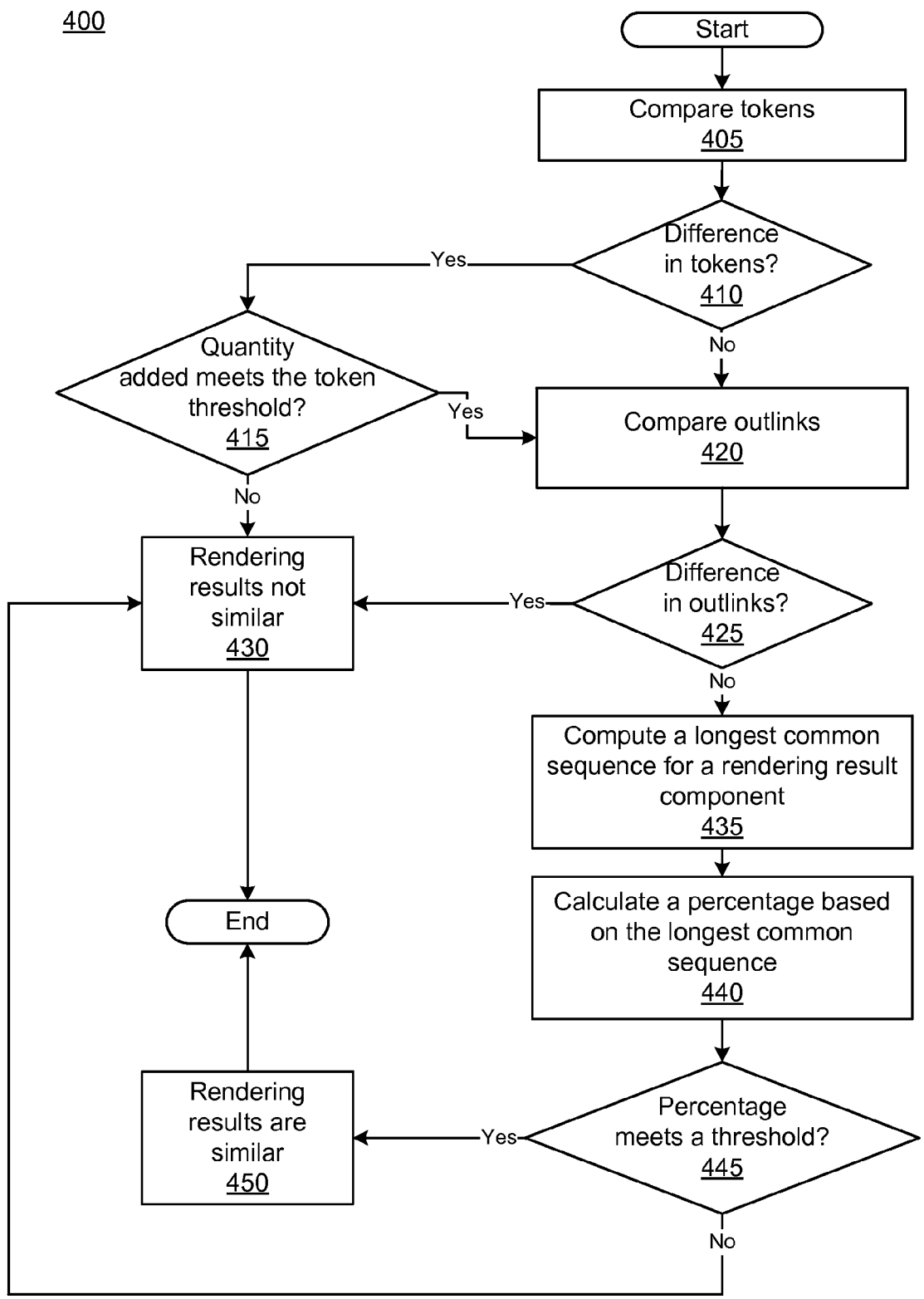
FIG. 4 is a flowchart illustrating an example process for determining whether two rendering results are similar, according to an implementation.

The system may use a variety of tests to determine whether the rendering results are similar, as discussed in more detail with regard to FIG. 4. If the rendering results are not similar (335, No), the system may move on to the next cluster (355). If the rendering results are similar (335, Yes), the system may determine if there are other embedded resources in the cluster sample to examine (340). If there are other embedded resources (340, No), the system may select the next embedded resource for the sample (345) and repeat step 330 and 335, generating two rendering results and comparing the results. If all embedded resources in the sample have been examined (340, Yes), the system may add the potential pattern for the cluster to the optional resource pattern data store (350). This data store may be used by a service to identify embedded resources that do not need to be fetched, as explained in greater detail with regard to FIG. 5. The system may then determine if there are other clusters to examine (355). If there are other clusters left to analyze (355, No), the system may select the next cluster, repeating steps 315 to 355 for embedded resources that match the potential pattern of the next cluster. If there are no more clusters to analyze (355, Yes), process 300 is complete.

The example process 300 illustrates an implementation where one embedded resource that is not optional will result in the potential pattern being left out of the optional resource pattern data store (e.g., 335, No). However, in some implementations, the system may keep a list of embedded resources for a potential pattern that are optional and a list of embedded resource for the potential pattern that are required (e.g., the two rendering results are not considered similar). In such implementations, the system may calculate the percentage of embedded resources that match the potential pattern that are required. When the percentage is very low (e.g., 1% or less), the system may still add the potential pattern to the optional resource pattern data store (350). Thus, implementations are not limited to the exact process 300 illustrated in FIG. 3.

In some implementations, the system may repeat some or all of process 300 with rendering results rendered by a different browser type. For example the browser type may be a full browser or a mobile browser. If the first and second rendering result were rendered by a full browser, the system may repeat steps 330 to 350 using a mobile browser. Thus, the list of optional resource patterns may include an indication of browser type, and the patterns in the data store may also include an indication of browser type. This allows the system to indicate whether the embedded resource is optional for one browser type (e.g., a mobile browser) and not for a different browser type (e.g., a full browser).

FIG. 4 is a flowchart illustrating an example process 400 for determining whether two rendering results are similar, according to an implementation. Process 400 may be performed, for example, as part of step 335 of FIG. 3. While process 400 illustrates three tests for determining rendering result similarity, it is understood that implementations may include one, two, or all of the tests illustrated, and may include additional similarity tests not illustrated.

Process 400 may include comparing the tokens in the two rendering results (405). The tokens include the text of a document, e.g., the words visible to a user. The tokens may be produced by processing the DOM tree, such as DOM tree 210 of FIG. 2. In some implementations, stop words and numbers may be removed before performing the comparison. If the tokens for the first rendering result differ from the tokens for the second rendering result (410, Yes), the system may optionally determine whether the quantity of unique tokens added by rendering with scripting turned on is less than a token threshold (415). In other words, if rendering with scripting turned on only results in a few unique tokens, the system may consider the differences insignificant. In some implementations the token threshold may be 5. If the quantity of unique tokens added meets the token threshold (415, No), the system may consider the rendering results not similar (430). When the rendering results are not similar, the embedded resource used to generate the rendering results is not optional. In some implementations, the system may skip test 415 and any differences in tokens may be considered significant and the rendering results not similar. If the quantity fails to meet the token threshold (415, Yes), the system may consider the difference in tokens insignificant. Thus, if the unique tokens for the first rendering result are the same as the tokens in the second rendering result (410, No) or the quantity of unique tokens fails to meet the token threshold (415, Yes), the rendering results may be considered similar, and the system may continue to perform other tests. In implementations that include only the token test, the system may proceed directly to step 445, with a determination that the rendering results are similar.

In some implementations, if the tokens are the same (410, No) or (415, Yes), the system may compare outlinks (420). Outlinks represent links to other web pages or other documents from the rendered page. The outlinks may also be extracted from anchor tag nodes (<a> tags) of the DOM tree of the rendering result. If the system finds a difference in outlinks (425, Yes), the system may consider the difference significant and the rendering results are not similar (430). Thus, the embedded resource is not considered optional. If the outlinks in the two rendering results are the same (425, No), the system may consider the rendering results similar (e.g., by proceeding to step 450), or may go on to perform other similarity tests. In some implementations, the system may perform steps 420 and 425 before and independently of steps 405 and 415.

In another similarity test, which can be performed in addition to or instead of the other tests, the system may determine similarity between the image (e.g., the snapshot), the DOM tree, or the layout. For example, the system may calculate a longest common sequence (LCS) for the DOM tree, the layout, the image, or another component of the rendering result (435). The system may use the LCS to calculate a similarity score that represents the percentage of the component that is the same (440). When the percentage meets a threshold (445, Yes), the system may determine that the rendering results are similar (450). When the percentage fails to meet a threshold (445, No), the system may determine that the rendering results are not similar (430). Once the system has determined whether the rendering results are similar (450) or not similar (430), process 400 ends.

Of course, the system may perform other tests as part of process 400. For example, in another similarity test (not shown in FIG. 4), the system may determine major components of the layout. The layout of a rendering result is made up of boxes—each box being defined by screen coordinates. Generally, each box corresponds to a respective element of the web page. For example, the layout can include box representations of DOM nodes in the DOM tree (although not every DOM elements may have a corresponding render box). The boxes can be organized in a tree structure, also known as a render tree. Thus, for example, a table may be represented by a box in the layout, and a paragraph may be represented by another box in the layout. Major components of a web page are those elements in the layout with the largest boxes, as defined by the screen coordinates. In some implementations, the system may include a predetermined quantity of the major components in the set, e.g., so that the set includes the largest of the major components. In some implementations, the system may include the major components that make up a percentage of the screen in the set. In such an implementation, if the largest major component takes up more than the percentage, the largest major component may be the only member of the set. In some implementations, any components with a box size above a threshold size may be included in the set of major components. A component that is not in the set of major components may be considered a minor component. In some implementations the system may use an onion peeling technique to find the major component. For example, starting at the root box of the render tree, the system may perform a breadth-first search and identify the largest child box of the root box. The system may then select the largest child and go deeper, finding the largest child box of the current box (e.g., the largest child box of the root box). The system may stop going deeper when none of the child boxes are dominating, for example occupying over half of the parent box's area. When the system stops going deeper, the major component is the box that failed to have a dominating child.

The system may calculate a similarity score between the major components in the set. For example, the system may use an overlapping score of the major component boxes. In an overlapping score, the system may calculate an overlap area for the major component, which represents an area of the major component in the first rendering result that overlaps with the area of the corresponding major component in the second rendering result. The system may then calculate a similar score, which represents the harmonic average of the overlap area with regard to the total area of each major component. For example, the system may use the formula $$\frac{2}{((a1/oa)+(a2/oa))}$$

where oa is the overlapping area, a1 is the total area of the major component box in the first rendering result and a2 is the total area of the major component box in the second rendering result. Of course, the system may use other similarity metrics to calculate the score. Examples of such similarity metrics include, but are not limited to Katz similarity. If the similarity score meets a similarity threshold, the rendering results are considered similar, and therefore the embedded resource is optional. In some implementations, the similarity threshold may be high, for example 80% or higher. If the similarity score fails to meet the threshold, the system may consider the rendering results not similar. In some implementations, if the similarity score meets the similarity threshold, the system may perform additional similarity tests based on the rendering results that are not illustrated in FIG. 4. In some implementations, the system may also calculate a similarity score for differences in minor components, but weigh these differences much less, e.g., making them a much smaller portion of the final similarity score for the rendering results.

In some implementations, the system may attempt to minimize or eliminate the effects of indeterminism on process 400. Indeterminism occurs when the rendering result is different even when the embedded resources are identical. Indeterminism may cause embedded resources that are optional to seem as if they are required. Thus, accounting for indeterminism may significantly increase the coverage of optional resources. To account for indeterminism, the system may generate a third rendering result. The third rendering result may be a rendering using the resources returned from the generation of the first rendering result (e.g., that includes the sample URL). Any differences caused between the third rendering result and the first rendering result are due to indeterminism. The system may sanitize the similarities by removing any differences that are due to indeterminism (e.g., differences in the outlinks, tokens, image, render tree, etc. that are different in the first and third rendering results). For example, the system may calculate a first quantity representing the number of pixels that are different between the image of the first rendering result and the image of the third rendering result and a second quantity representing the number of pixels that are different between the images of the first rendering result and the second rendering result. The system may subtract the first quantity from the second quantity to produce a difference. The closer the difference is to the second quantity, the more likely it is that any differences between the first and the second rendering results are not due to indeterminism. Thus, the system may adjust the similarity score of the LCS based on the difference (e.g., no adjustment if the difference equals the second quantity, adjust by half if the difference is half of the second quantity, etc.) As another example, the system may determine the DOM nodes that are different between the first rendering result and the third rendering result and ignore these nodes when comparing the first rendering result to the second rendering result (e.g., calculating the LCS).

Figure 5:
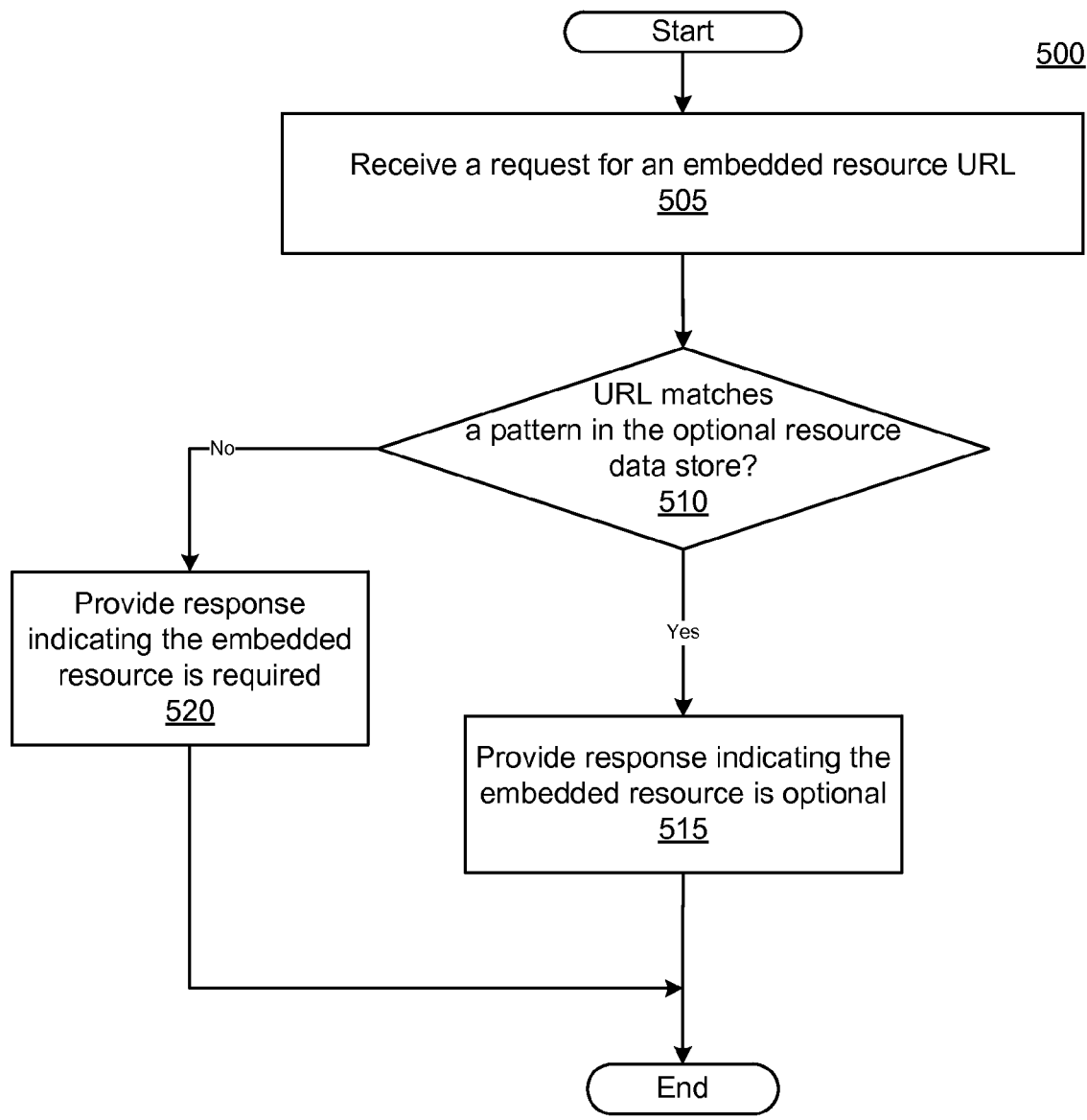
FIG. 5 is a flowchart illustrating an example process for providing information for optimized rendering, according to an implementation.

FIG. 5 is a flowchart illustrating an example process 500 for providing information for optimized rendering, according to an implementation. Process 500 may be run as a service for a browser. The browser can be a client browser, either mobile or full, such as browser 140 of FIG. 1, or a batch rendering engine, such as batch rendering engines 120 of FIG. 1. In some implementations, the service may be a cloud-based service. In other words, the browser may send a request via a network to a cloud-based service, which may provide a response to the browser. In some implementations the service may be run on a server, such as batch rendering system 110 of FIG. 1. In other implementations, the service may be local to the computing device on which the browser runs. For example, the data store of optional resource patterns may be pushed to the computing device that runs the browser, and the service may be executed at the computing device. In some implementations, the service may be run on a client, such as client 180 of FIG. 1.

Process 500 begins with the service receiving a URL from a browser (505). The browser may be a mobile browser, a full browser, and may be run on a client or as a batch rendering engine. The service may determine whether the URL from the request matches an optional resource pattern (510). In some implementations, the pattern may represent a full URL, so that a match is made on the entire requested URL. In some implementations, the pattern may represent a partial URL, for example with a query string removed or with various portions replaced by wild cards. If the requested URL does match at least one pattern in the optional resource data store (510, Yes), the service provides a response that indicates the URL is optional and the embedder web page can be rendered without fetching the content (515). In some implementations, this may be a response similar to a "URL not found" response that a browser may receive when a resource cannot be located. In response to receiving this indication, the browser may render the embedder web page skipping the embedded resource, saving processing and bandwidth resources. If the requested URL does not match a pattern in the optional resource data store (510, No), the service provides a response that indicates that the embedded resource is required (520). In some implementations, the service may actually perform the fetch and provide the content for the embedded resource. In some implementations, the service may provide a response that tells the browser to proceed with a fetch request for the embedded resource. Thus, the browser may render the embedder web page with the content for the embedded resource. Process 500 then ends, having provided information that the browser can use to optimize the rendering process. In some implementations, the browser may provide a browser type to the service, and the service may use the browser type when matching patterns in the optional resource data store.

FIG. 6 shows an example of a generic computer device 600, which may be operated as batch rendering system 110, and/or client 180 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, e.g., a silicone-based hardware processor, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computing device, such as laptop computer 632, desktop computer 634, or tablet or smart phone 636. An entire system may be made up of multiple computing devices 600 communicating with each other. Other configurations are possible.

FIG. 7 shows an example of a generic computer device 700, which may be system 110 of FIG. 1, which may be used with the techniques described here. Computing device 700 is intended to represent various example forms of large-scale data processing devices, such as servers, blade servers, data centers, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing device 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780*a* includes multiple racks 758*a*-758*n*. Each rack may include one or more processors, such as processors 752*a*-752*n* and 762*a*-762*n*. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752*a*-752*n*. Data structures, such as an index, may be stored, for example, across storage 756 and memory 754. Computing device 700 may include other components not shown, such as controllers, buses, input/output devices, communications modules, etc.

An entire system, such as system 110, may be made up of multiple computing devices 700 communicating with each other. For example, device 780*a* may communicate with devices 780*b*, 780*c*, and 780*d*, and these may collectively be known as system 100. As another example, system 100 of FIG. 1 may include one or more computing devices 700. Some of the computing devices may be located geographically close to each other, and others may be located geographically distant. The layout of computing device 700 is an example only and the system may take on other layouts or configurations.

Various implementations can include implementation in one or more computer programs that are executable and/or interpretable on a programmable system including at least one programmable processor formed in a substrate, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
    at least one processor; and
    memory storing instructions that, when executed by the at least one processor, cause the system to:
        identify a URL pattern common to a plurality of URLs stored in fetch records;
        select a sample of URLs from the plurality of URLs;
        for each URL in the sample, determine whether the URL is optional by:
            generating a first rendering result for an embedder of the URL using content for the URL,
            generating a second rendering result for the embedder without using the content for the URL,
            calculating a similarity score for the URL by comparing the first rendering result to the second rendering result, and
            determining that the URL is optional when the similarity score is greater than a similarity threshold; and
        responsive to determining a predetermined quantity of the URLs in the sample are optional, store the URL pattern in a data store of optional resource patterns.

2. The system of claim 1, the instructions further including instructions that, when executed by the at least one processor, cause the system to:

receive a request for content of a requested embedded resource;

determine whether the requested embedded resource matches the pattern in the data store; and responsive to determining the requested embedded resource matches the pattern, return an indication that the requested embedded resource is optional.

3. The system of claim 2, wherein the indication is a URL not found error.

4. The system of claim 1, wherein the quantity of the URLs is equal to a quantity of URLs in the sample.

5. The system of claim 1, wherein identifying the URL pattern common to the plurality of URLs stored in the fetch records includes:

generating a group URL for respective URLs stored in the fetch records by removing at least a portion of a query string from the URL; and clustering the URLs by group URL.

6. The system of claim 1, wherein identifying the URL pattern common to the plurality of URLs stored in the fetch records includes:

generating a group URL for respective URLs stored in the fetch records by removing at least a portion of a query string from the URL;

clustering the URLs by group URL; and selecting the group URL of a cluster with a highest number of members as the URL pattern.

7. The system of claim 1, wherein calculating the similarity score includes:

determining a longest common sequence for a DOM tree of the first rendering result and a DOM tree of the second rendering result; and using the longest common sequence to determine the similarity score.

8. A method comprising:

identifying, using at least one processor, a URL pattern common to a plurality of URLs stored in fetch records;

selecting, using the at least one processor, a sample of URLs from the plurality of URLs;

for each URL in the sample, determining whether the URL is optional by:

generating a first rendering result for an embedder of the URL using content for the URL and a second rendering result for the embedder without using the content for the URL, and calculating a similarity score for the URL by comparing the first rendering result and the second rendering result, the URL being optional responsive to determining the similarity score is greater than a similarity threshold; and responsive to determining a majority of the URLs in the sample are optional, storing the URL pattern in a data store of optional resource patterns.

9. The method of claim 8, further comprising:

receiving a request for content of a requested embedded resource;

determining whether the requested embedded resource matches the pattern in the data store; and responsive to determining the requested embedded resource matches the pattern, returning an indication that the requested embedded resource is optional.

10. The method of claim 8, further comprising: determining that a quantity represented by the plurality of URLs exceeds a size threshold prior to determining whether URLs in the sample are optional.

11. The method of claim 8, further comprising: responsive to determining all the URLs in the sample are optional, storing the URL pattern in the data store of optional resource patterns.

12. The method of claim 8, wherein identifying the URL pattern common to the plurality of URLs in the fetch records includes:

for respective URLs in the fetch records, generating a group URL for the URL in the fetch record by removing at least a portion of a query string from the URL; and clustering by group URL.

13. The method of claim 8, wherein identifying the URL pattern common to the plurality of URLs in the fetch records includes:

for respective URLs in the fetch records, generating a group URL for the URL in the fetch record by removing at least a portion of a query string from the URL;

clustering by group URL; and selecting the group URL of a cluster responsive to determining a quantity of members in the cluster meets a threshold.

14. The method of claim 8, wherein calculating the similarity score includes:

determining a longest common sequence for a DOM tree of the first rendering result and a DOM tree of the second rendering result; and using the longest common sequence to determine the similarity score.

15. A method comprising:

receiving a request to render a web page;

identifying, using at least one processor, at least one embedded resource in the web page that requires a fetch;

determining that the embedded resource is an optional resource by determining that a URL for the embedded resource matches a pattern in a data store identifying optional resources; and rendering, using the at least one processor, the web page as if the embedded resource is unavailable without fetching content for the embedded resource.

16. The method of claim 15, further comprising:

receiving the data store of patterns identifying optional resources from a service.

17. The method of claim 15, wherein the embedded resource is optional responsive to determining a rendering result of an embedder web page rendered with the embedded resource is similar to a rendering result of the embedder web page rendered without the embedded resource.

18. The method of claim 15, wherein determining that the embedded resource is an optional resource includes:

rewriting the URL for the embedded resource by removing a query string from the URL; and matching the rewritten URL to the pattern in the data store identifying optional resources, wherein the embedded resource is optional when the rewritten URL matches the pattern.

19. The method of claim 15, wherein determining that the embedded resource is an optional resource includes:

rewriting the URL for the embedded resource by removing at least a portion of a query string from the URL; and matching the rewritten URL to the pattern in the data store identifying optional resources, wherein the embedded resource is optional when the rewritten URL matches the pattern.

20. The method of claim 15, the data store identifying optional resources being populated based on comparison of rendering results.

\* \* \* \* \*